(12) United States Patent
Schweitzer, III et al.

(10) Patent No.: US 12,184,343 B2
(45) Date of Patent: Dec. 31, 2024

(54) SYSTEMS AND METHODS TO COMMUNICATE DATA BETWEEN DEVICES OF AN ELECTRIC POWER DELIVERY SYSTEM

(71) Applicant: Schweitzer Engineering Laboratories, Inc., Pullman, WA (US)

(72) Inventors: Edmund O. Schweitzer, III, Pullman, WA (US); Miralem Cosic, Spokane, WA (US); Raymond W. Rice, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 399 days.

(21) Appl. No.: 17/450,374

(22) Filed: Oct. 8, 2021

(65) Prior Publication Data

US 2023/0113010 A1    Apr. 13, 2023

(51) Int. Cl.
*H04B 17/10* (2015.01)
*H04B 1/60* (2006.01)
*H04B 7/155* (2006.01)

(52) U.S. Cl.
CPC ............ *H04B 17/103* (2015.01); *H04B 1/60* (2013.01); *H04B 7/155* (2013.01)

(58) Field of Classification Search
CPC ........ H04B 17/103; H04B 1/60; H04B 7/155; H04B 7/15528; G08C 17/02; H04W 24/10; H04W 84/047; H04Q 9/00
See application file for complete search history.

(56) References Cited

U.S. PATENT DOCUMENTS

| | | |
|---|---|---|
| 3,239,678 A | 3/1966 | Kolm |
| 4,829,239 A | 5/1989 | Holstein |
| 5,293,323 A | 3/1994 | Doskocil |
| 5,465,399 A | 11/1995 | Oberholtzer |
| 5,479,095 A | 12/1995 | Michalek |
| 5,608,306 A | 3/1997 | Rybeck |
| 5,726,644 A | 3/1998 | Jednacz |

(Continued)

FOREIGN PATENT DOCUMENTS

| | | |
|---|---|---|
| CA | 2540774 | 9/2006 |
| CA | 2240514 | 11/2008 |

(Continued)

OTHER PUBLICATIONS

Rengaraju, et al, "Communication Requirements and Analysis of Distribution Networks Using WiMAX Technology for Smart Grids," 2012 8th International Wireless Communications and Mobile Computing Conference (IWCMC), Limassol, Cyprus, 2012, pp. 666-670 (Year: 2012).

(Continued)

*Primary Examiner* — Lana N Le
(74) *Attorney, Agent, or Firm* — Fletcher Yoder, P.C.

(57) ABSTRACT

A wireless radio repeater includes an antenna configured to receive a message associated with an electric power delivery system. The wireless radio repeater also includes circuitry configured to receive electrical measurement data, identify a condition of the electric power delivery system based on the electrical measurement data, and cause the antenna to re-transmit the message received via the antenna in response to identifying the condition based on the electrical measurement data.

13 Claims, 8 Drawing Sheets

(56) References Cited

U.S. PATENT DOCUMENTS

| | | |
|---|---|---|
| 5,861,684 A | 1/1999 | Slade |
| 5,862,186 A | 1/1999 | Kumar |
| 6,029,074 A | 2/2000 | Irvin |
| 6,046,582 A | 4/2000 | Sanelli |
| 6,112,159 A | 8/2000 | Bond |
| 6,304,176 B1 | 10/2001 | Discenzo |
| 6,492,910 B1 | 12/2002 | Ragle |
| 6,657,418 B2 | 12/2003 | Atherton |
| 6,816,439 B1 | 11/2004 | Kawahara |
| 6,894,478 B1 | 5/2005 | Fenske |
| 6,901,242 B2 | 5/2005 | Kroeger |
| 7,060,379 B2 | 6/2006 | Speranza |
| 7,103,786 B2 | 9/2006 | Chen |
| 7,132,763 B2 | 11/2006 | Rendic |
| 7,170,194 B2 | 1/2007 | Korcharz |
| 7,224,272 B2 | 5/2007 | White |
| 7,274,168 B2 | 9/2007 | Tskukamoto |
| 7,315,169 B1 | 1/2008 | Fenske |
| 7,382,272 B2 | 3/2008 | Feight |
| 7,339,353 B1 | 4/2008 | Masias |
| 7,369,950 B2 | 5/2008 | Wall |
| 7,385,374 B2 | 6/2008 | Frantz |
| 7,398,101 B2 | 7/2008 | Zinn |
| 7,411,371 B2 | 8/2008 | Hobbs |
| 7,412,338 B2 | 8/2008 | Wynans |
| 7,667,482 B2 | 2/2010 | Mort |
| 7,729,405 B2 | 6/2010 | Inoue |
| 7,948,352 B2 | 5/2011 | Tang |
| 7,983,230 B1 | 7/2011 | Li |
| 8,103,463 B2 | 1/2012 | Kalgren |
| 8,427,131 B2 | 4/2013 | Bryson |
| 8,650,411 B2 | 2/2014 | Feight |
| 9,386,529 B2 | 7/2016 | Swartzendruber |
| 9,685,992 B2 | 6/2017 | Bennett |
| 9,699,785 B2 | 7/2017 | Henry |
| 9,930,668 B2 | 3/2018 | Barzegar |
| 9,999,038 B2 | 6/2018 | Barzegar |
| 10,009,065 B2 | 6/2018 | Henry |
| 10,020,844 B2 | 7/2018 | Bogdan |
| 10,291,334 B2 * | 5/2019 | Henry ............... H04B 7/155 |
| 10,359,749 B2 | 7/2019 | Bogdan |
| 10,419,064 B2 | 9/2019 | Cosic |
| 10,439,675 B2 | 10/2019 | Johnson |
| 10,520,966 B2 | 12/2019 | Veda |
| 10,534,377 B2 | 1/2020 | Dolezilek |
| 10,587,198 B2 | 3/2020 | Herbert |
| 10,656,181 B2 | 5/2020 | Sobolewski |
| 10,755,542 B2 | 8/2020 | Bogdan |
| 11,175,314 B2 | 11/2021 | Brehm |
| 11,209,465 B2 | 12/2021 | Hao |
| 11,215,980 B2 | 1/2022 | Cella |
| 11,221,613 B2 | 1/2022 | Cella |
| 11,231,733 B2 | 1/2022 | Veda |
| 11,451,993 B2 * | 9/2022 | Steigert ............ H04W 24/10 |
| 11,889,333 B2 * | 1/2024 | Cho ................. H04W 24/08 |
| 2001/0054878 A1 | 12/2001 | Odaohhara |
| 2003/0020332 A1 | 1/2003 | Giannopoulos |
| 2003/0111908 A1 | 6/2003 | Christensen |
| 2004/0036359 A1 | 2/2004 | Griffith |
| 2004/0078606 A1 | 4/2004 | Chen |
| 2004/0256915 A1 | 12/2004 | Phinney |
| 2005/0006956 A1 | 1/2005 | Shi |
| 2005/0128057 A1 | 6/2005 | Mansfield |
| 2005/0168326 A1 | 8/2005 | White |
| 2005/0253560 A1 | 11/2005 | Popescu-Stanesti |
| 2006/0077607 A1 | 4/2006 | Henricks |
| 2007/0269219 A1 | 11/2007 | Teller |
| 2008/0122518 A1 | 5/2008 | Besser |
| 2008/0174278 A1 | 7/2008 | Masias |
| 2008/0287082 A1 | 11/2008 | Govindswamy |
| 2009/0240449 A1 | 9/2009 | Gibala |
| 2009/0243796 A1 | 10/2009 | Tieman |
| 2010/0013632 A1 | 1/2010 | Salewske |
| 2010/0084920 A1 | 4/2010 | Banting |
| 2010/0085036 A1 | 4/2010 | Banting |
| 2010/0138066 A1 | 6/2010 | Kong |
| 2010/0280775 A1 | 11/2010 | Schafer |
| 2011/0001485 A1 | 1/2011 | Feight |
| 2013/0043788 A1 | 2/2013 | O'Brien |
| 2013/0187637 A1 | 7/2013 | Saxby |
| 2013/0234696 A1 | 9/2013 | Bryson |
| 2013/0301683 A1 | 11/2013 | Sinsuan |
| 2014/0064162 A1 | 3/2014 | Swartzendruber |
| 2014/0119331 A1 | 5/2014 | Ji |
| 2014/0251478 A1 | 9/2014 | Dolezilek |
| 2014/0351010 A1 | 11/2014 | Kong |
| 2015/0012233 A1* | 1/2015 | Mizuta ............... H04B 3/54 |
| | | 702/62 |
| 2015/0163867 A1 | 6/2015 | Recker |
| 2015/0244121 A1 | 8/2015 | Amelio |
| 2016/0209445 A1 | 7/2016 | McCammon |
| 2016/0330825 A1 | 11/2016 | Recker |
| 2016/0359530 A1* | 12/2016 | Bennett ............. H04B 7/04 |
| 2017/0162320 A1 | 6/2017 | Rumrill |
| 2017/0223807 A1 | 8/2017 | Recker |
| 2018/0143234 A1 | 5/2018 | Saxby |
| 2018/0203472 A1 | 7/2018 | Dolezilek |
| 2018/0284735 A1 | 10/2018 | Cella |
| 2018/0321285 A1 | 11/2018 | Keister |
| 2019/0121350 A1 | 4/2019 | Cella |
| 2019/0190586 A1* | 6/2019 | Tanaka ............. H04W 84/08 |
| 2019/0331722 A1 | 10/2019 | Hao |
| 2020/0191841 A1* | 6/2020 | Lakirovich ......... G01R 31/54 |
| 2020/0226895 A1 | 7/2020 | Masters |
| 2021/0102981 A1 | 4/2021 | Mobley |
| 2021/0109136 A1 | 4/2021 | Hao |
| 2021/0109137 A1 | 4/2021 | Hao |
| 2021/0109138 A1 | 4/2021 | Blair |
| 2021/0109141 A1 | 4/2021 | Hao |
| 2021/0231736 A1 | 7/2021 | Achanta |
| 2021/0350960 A1 | 11/2021 | Rostron |
| 2022/0116103 A1 | 4/2022 | Cosic |

FOREIGN PATENT DOCUMENTS

| | | |
|---|---|---|
| CA | 3062681 | 6/2020 |
| CN | 201583604 | 9/2010 |
| CN | 103293362 | 12/2015 |
| CN | 103487629 | 9/2016 |
| CN | 106953527 | 8/2020 |
| CN | 107677867 | 1/2021 |
| CN | 112868191 | 5/2021 |
| DE | 4331796 | 3/1995 |
| DE | 69832556 | 8/2006 |
| DE | 102015226430 | 6/2017 |
| DE | 102020118110 | 1/2021 |
| EP | 1703289 A1 | 9/2006 |
| EP | 1703289 B1 | 11/2010 |
| EP | 3264107 | 3/2019 |
| EP | 2885647 | 1/2022 |
| JP | 2018157630 | 10/2018 |
| JP | 6903963 | 7/2021 |
| WO | 2014191776 | 12/2014 |
| WO | 2015196193 | 12/2015 |
| WO | 2017158385 | 9/2017 |
| WO | 2018168078 | 9/2018 |

OTHER PUBLICATIONS

Y.L. Song and K. Sarabandi, "Miniaturized Radio Repeater for Enhanced Wireless Connectivity of Ad-Hoc Networks," in IEEE Transactions on Antennas and Propagation, vol. 60, No. 8, pp. 3913-3920, Aug. 2012, doi: 10.1109/TAP.2012.2201124. (Year: 2012).

I. B. Vendik, I. Steblevska, V. A. Gerasimov, S. Y. Dudnikov, L. M. Selivanov, and A. A. Uhov, "Energy Harvesting for Wireless Sensors from Power Lines Electric Field," 2017 IEEE International Conference on RFID Technology & Applicatino (RFID-TA), 2017, pp. 125-128, dol: 10.1109/RFID-TA.2017.8098863.

Y. Mahamat, S. R. Hussain and A. Eroglu, "Far-field RF energy harvesting system for distribution power lines," 2016 IEEE/ACES International Conference on Wireless Information Technology and

(56) References Cited

OTHER PUBLICATIONS

Systems (ICWITS) and Applied Computational Electromagnetics (ACES), 2016, pp. 1-2, doi: 10.1109/ROPACES.2016.7465303.

* cited by examiner

SYSTEMS AND METHODS TO COMMUNICATE DATA BETWEEN DEVICES OF AN ELECTRIC POWER DELIVERY SYSTEM

BACKGROUND

This disclosure relates to communication for an electric power delivery system and, more particularly, to improving security and/or selectivity of communication between devices of the electric power delivery system.

Electric power delivery or distribution systems carry electricity from a transmission system to residential communities, factories, industrial areas, and other electricity consumers. To monitor power distribution, electrical measurement devices of the electric power delivery system may use electrical sensors to obtain electrical measurements that may be used to determine one or more aspects of the electricity being transferred through a distribution line (e.g., a load direction). Such electrical measurements may be useful when determining control actions that should be taken on the electric power delivery system. The electrical measurements may be wirelessly transmitted to another device, such as an intelligent electronic device and/or a control system. However, structures and/or obstacles may impede a successful transmission of data of the electrical measurements. Without receipt of the electrical measurements by an intended recipient, it may be difficult to determine a control action to be performed with respect to the electric power delivery system. Additionally, in some circumstances, electrical measurements may be undesirably transmitted to and received by a device of the electric power delivery system. For example, the device may receive an electrical measurement that may be erroneous and/or irrelevant with respect to operation of the electric power delivery system associated with the device. In response, a resultant control action may be undesirably performed and may affect the operation of the electric power delivery system . . .

DETAILED DESCRIPTION

Figure 1:
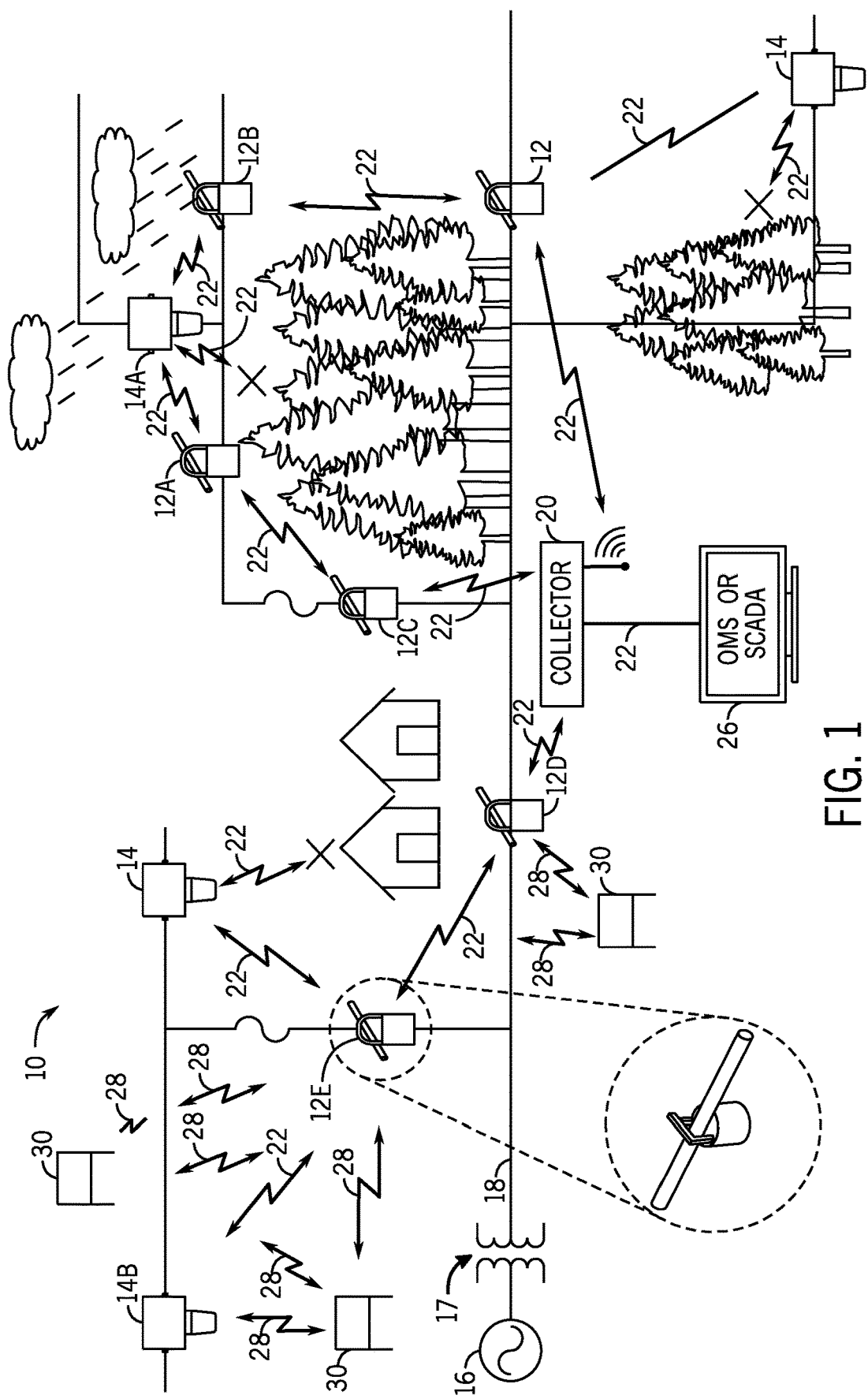
FIG. 1 is a schematic diagram of an electric power delivery system with wireless line sensors that use wireless radio repeaters to transmit electrical measurements to a control system of the electric power delivery system, in accordance with an embodiment.

When introducing elements of various embodiments of the present disclosure, the articles "a," "an," and "the" are intended to mean that there are one or more of the elements. The terms "comprising," "including," and "having" are intended to be inclusive and mean that there may be additional elements other than listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

In addition, several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Thus, embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

As mentioned above, electric power delivery or distribution systems carry electricity from a transmission system to residential communities, factories, industrial areas, and other electricity consumers. To monitor power distribution, electrical measurement devices on the electric power delivery system may use electrical sensors to obtain electrical measurements that may be used to determine aspects (e.g., load direction, fault) of the electrical power. Such electrical measurements may be used in providing better load-balancing, improving power quality and efficiency, and/or responding to potential conditions (e.g., a fault) that may be indicated by the electrical measurements.

Electrical measurement devices may transmit the electrical measurements to a recipient device, such as an intelligent electronic device (IED) and/or a control system. The recipient device may control one or more aspects of the electric power delivery system. Because electrical measurement devices may be dispersed across the electric power delivery system, many electrical measurement devices may send the electrical measurements that they obtain to the recipient device using radio communications. However, reliable transmission of the electrical measurement data over a distance via radio waves may depend upon many factors. These factors may include the amount of power used to transmit the radio signal, sizes of antennas used between communication nodes, heights of the antennas above ground level, distances between antennas, and/or environmental obstacles or obstructions between antennas (e.g., vegetation, buildings, landforms), to name a few. Indeed, some obstructions could cause unreliable or incomplete transmission of the electrical measurement data, such as by reflecting, deflecting, and/or absorbing radio waves such that electrical measurement data transmitted via radio waves may not arrive at a desired location.

Wireless radio repeaters may be used to route around obstacles and facilitate data transmission through the electric power delivery system. The wireless radio repeaters may increase a reliability of transmission and reception of radio signals from wireless electrical measurement devices to a recipient device of the electric power delivery system. The wireless radio repeaters may reliably re-transmit and receive valuable or sensitive data (e.g., electrical measurement data related to an operation of a component of an electric power delivery system). To this end, the wireless radio repeaters may be placed in strategic locations to provide line of sight transmission and reception of signals. A wireless radio repeater may receive a wireless message from an electrical measurement device and/or another wireless radio repeater. The wireless radio repeater may re-transmit the wireless message to a recipient device of the electric power delivery system and/or to another wireless radio repeater to assist in sending the wireless message to the recipient device of the electric power delivery system. In some embodiments, a wireless radio repeater may be a standalone device. In additional or alternative embodiments, a wireless radio repeater may be integrated into an electrical measurement device. In such embodiments, the electrical measurement device may both obtain electrical measurements to send to the recipient device and also re-transmit wireless messages received from other electrical measurement devices and/or wireless radio repeaters.

The wireless radio repeaters may also verify a wireless message to be re-transmitted. For example, a wireless radio repeater may process electrical measurement data to monitor for a condition of the electric power delivery system. In response to identifying the condition of the electric power delivery system based on the electrical measurement data, the wireless radio repeater may re-transmit a received wireless message indicative of the condition. As an example, the wireless radio repeater may initially receive the wireless message (e.g., from an electrical measurement device, from another wireless radio repeater) indicative of the condition, corroborate the indicated condition by identifying the condition based on electrical measurement data, and re-transmit the received wireless message in response to verifying the message. As another example, the wireless radio repeater may initially identify the condition based on electrical measurement data, receive the wireless message indicative of the condition after identifying the condition, and re-transmit the received wireless message in response. In this manner, the wireless radio repeater may verify conditions indicated by received wireless messages and block incorrect or inaccurate wireless messages from being re-transmitted through the electric power delivery system. In additional or alternative embodiments, another device of the electric power delivery system, such as an IED, may verify a condition of the electric power delivery system to determine whether an action may be performed in response to a received wireless message. Thus, a more appropriate or desirable action may be performed in response to the received wireless message to improve overall operation of the electric power delivery system.

Turning to the drawings, FIG. 1 is a schematic diagram of an electric power delivery or distribution system 10 with wireless radio repeaters 12 and wireless line sensors 14 disposed in various locations, in accordance with an embodiment. The electric power delivery system 10 may receive electric power from a variety of generators 16. For example, electric power is shown in FIG. 1 as generated by a generator 16. A transformer 17 may step up or step down voltage from the generator 16 as specified for transmission through distribution lines 18. Dispersed at various locations throughout the distribution lines 18 of the electric power delivery system 10 are wireless line sensors 14, some of which may have integrated wireless radio repeaters. The wireless line sensors 14 (e.g., electrical measurement devices) may be able to obtain certain electrical measurements at the various locations of the electric power delivery system 10. For example, the wireless line sensors 14 may measure electrical current and/or voltage. The wireless line sensors 14 may wirelessly transmit electrical measurements to a wireless line sensor collector 20 via radio signals 22 (e.g., signals in the radio frequency range of the electromagnetic spectrum). The wireless line sensor collector 20 may also communicate via radio signals 22 and/or via a wired communication medium (not shown) with a control system, such as an Outage Management System (OMS) or Supervisory Control and Data Acquisition (SCADA) system 26. In some cases, the wireless line sensor collector 20 may be a component of or integrated into the control system of the electric power delivery system 10. The radio signals 22 may be understood to be sent to or from the control system of the electric power delivery system 10. In one example, the radio signals 22 may contain electrical measurement data captured at a wireless line sensor 14. The electrical measurement data may be re-transmitted to a wireless radio repeater 12, which may re-transmit the radio signals 22 to the wireless line sensor collector 20, and the wireless line sensor collector 20 may re-transmit the radio signals to the OMS or SCADA system 26. In another example, the radio signals 22 may contain control commands or other data that may be transmitted from the OMS or SCADA system 26 and received or re-transmitted at the wireless line sensor collector 20, wireless line sensor 14, and/or wireless radio repeater 12.

The wireless line sensors 14, the wireless line sensor collector 20, and/or the OMS or SCADA system 26 may use the electrical measurements obtained by the wireless line sensors 14 to determine conditions or properties of the electric power delivery system 10 in specific locations of the electric power delivery system 10. For example, measurement data indicative of a low amount of current for a period of time may indicate the presence of a fault in the electric power delivery system 10. Other examples of conditions that may be indicated by the measurement data may include overcurrent, instantaneous voltage, time after zero crossing of voltage or current, sudden change in voltage or current, low voltage, sudden change in phase between voltage and current, a harmonic issue, another suitable condition, or any combination thereof. The wireless line sensors 14 may transmit a message (e.g., a wireless message) indicative of the condition of the electric power delivery system 10 and/or that includes the electrical measurements obtained by the wireless line sensors 14. A control action may be performed based on the electrical measurements. By way of example, the OMS or SCADA system 26 may transmit a notification in response to the condition, such as to inform a user (e.g., a technician, an operator) regarding the condition of the electric power delivery system 10. In additional or alternative embodiments, the electric power delivery system 10 may include another device, such as an IED, that may operate based on the electrical measurements, such as by blocking current flow through a section of the electric power delivery system 10, coordinating operation of different devices (e.g., voltage regulators, capacitors), and so forth.

In the illustrated embodiment, the wireless line sensors 14 are disposed in a plurality of locations on the electric power delivery system 10. The wireless line sensors 14 may attempt to communicate wirelessly via the radio signals 22 to the wireless line sensor collector 20. The radio signals 22 may be directly transmitted to and/or from a collector system (e.g., the wireless line sensor collector 20) and, by extension, to and/or from the control system of the electric power delivery system 10. However, obstacles and/or obstructions may be present between a line-of-sight communication path of the wireless line sensors 14 and the wireless line sensor collector 20. These obstacles, which may include structural obstacles (e.g., homes, commercial buildings, trees, hills), may attenuate and thus decrease a reliability of a radio signal from the wireless line sensor 14 and to the wireless line collector 20. Moreover, some electric power delivery systems 10 may span vast distances, which may also substantially attenuate radio signals. To mitigate the effects of signal attenuation due to obstacles and/or distances, dispersed throughout the electric power delivery system 10 are wireless radio repeaters 12 and/or wireless line sensors 14 that have integrated wireless radio repeaters. The wireless radio repeaters 12 may facilitate communication via radio signals 22 to other devices on the electric power delivery system 10.

In the illustrated embodiment, the wireless radio repeaters 12 are strategically placed so as to provide a line of sight communication path to another communication node (e.g., another wireless radio repeater 12, another wireless line sensor 14, the wireless line sensor collector 20, the OMS or SCADA system 26). The wireless radio repeaters 12 may also be strategically placed so as to decrease signal attenuation due to a distance between a wireless line sensor 14 and a wireless line sensor collector 20 exceeding a threshold distance, for example. In this way, the wireless line sensors 14 may communicate, via the radio signals 22, to a communication node that is closer in proximity and/or has a line of sight communication path to a destination communication node or another communication node that may be able to receive and re-transmit (e.g., repeat) radio signals having electrical measurements sampled at a wireless line sensor 14.

For example, a wireless line sensor 14A may report electrical measurement data it samples to the wireless line sensor collector 20. As illustrated, forestry lies between a direct communication path of radio signals 22 (e.g., data packets) originating at the wireless line sensor 14A and ending at the wireless line sensor collector 20. Such obstacles may impede a successful transmission of electrical measurement data sampled at the wireless line sensor 14A. Thus, the wireless line sensor 14A may transmit radio signals 22 to the wireless radio repeater 12A and/or a wireless radio repeater 12B, since the wireless line sensor 14A has a line of sight communication path with both the wireless radio repeater 12A and the wireless radio repeater 12B. If the wireless line sensor 14A transmits the radio signals 22 to the wireless radio repeater 12A, then the wireless radio repeater 12A may receive the radio signals 22 and then re-transmit the radio signals 22 having the electrical measurement data captured at the wireless line sensor 14A to a wireless radio repeater 12C. The wireless radio repeater 12C may then re-transmit (e.g., repeat, broadcast) the radio signals 22 to the wireless line sensor collector 20.

The wireless radio repeaters 12 may be strategically placed along specific locations of the electric power delivery system 10 so as to minimize the number of obstructions or obstacles (e.g., hills, buildings, vegetation) that may decrease a reliability of transmission of the radio signals 22. Indeed, the wireless radio repeaters 12 may receive and repeat data packets being transmitted from other devices of the electric power delivery system 10 to limit attempts to communicate data via an obstructed path. In this way, the reliability of the transmission of data between communication nodes is increased.

The wireless radio repeaters 12 may also be strategically placed at specific locations of the electric power delivery system 10 to allow for successful communication in "noisy" environments, in which radio interference is present. In the depicted embodiment, interfering radio signals 28, which are transmitted to or from radio signal sources 30, may disrupt communication between communication nodes of the electric power delivery system 10. The interfering radio signals 28 represent undesirable radio signals from the perspective of the electric power delivery system 10, since the interfering radio signals 28 may interfere with the radio signals 22. The radio signal sources 30 may include natural sources, such as the sun, as well as manmade sources, such as radio towers, cellular towers, wireless local area networks (e.g., home Wi-Fi) installed around the electric power delivery system 10. In some cases, radio interference resulting from the interfering radio signals 28 may decrease a reliability of transmission of data between communication nodes of the electric power delivery system 10. Indeed, the interfering radio signals 28 may effectively compete with communication between the radio-enabled elements of the electric power delivery system 10. To reduce communication blockage (e.g., disruption, interference) due to radio interference, the wireless radio repeaters 12 may boost (e.g., amplify) desired radio signals 22 so that a receiver (e.g., a communication node) of the electric power delivery system 10 may detect the desired radio signal 22 even in locations with concentrations of interfering radio signals 28. As such, the desired radio signal 22 may be discernable by the receiver, reducing negative effects of transmitting radio signals 22 in areas with high interfering radio signal 28 concentration.

For example, the wireless line sensor 14B may attempt to communicate with a wireless radio repeater 12D. However, interfering radio signals 28 are in high concentration around the wireless radio repeater 12D and may cause interference such that the communication of the wireless line sensor 14B with the wireless radio repeater 12D could be disrupted. A wireless radio repeater 12E may boost (e.g., amplify) the radio signals 22 received from the wireless line sensor 14B. This may allow the wireless radio repeater 12D to discern the boosted radio signals 22 even though the wireless radio repeater 12D is near interfering radio signals 28. In some cases, the degree to which the wireless radio repeaters 12 may boost or not boost messages in the radio signals 22 may vary depending on the presence or absence of interfering radio signals 28. For example, if a wireless radio repeater 12 detects more than a threshold strength of interfering radio signals 28, the wireless radio repeater 12 may boost the radio signals 22 to a greater degree than otherwise. In another example, if a wireless radio repeater 12 detects more than a threshold strength of interfering radio signals 28 in the same frequency band as the radio signals 22 that are being received, the wireless radio repeater 12 may repeat the message of the radio signals 22 in a different frequency band rather than the same frequency band (e.g., may negotiate with a downstream receiver a new frequency band over which to re-transmit messages).

A failure of one or more transmissions of data (or respective portions of the data) may be costly due to the urgency of a control action that may be indicated by a sampling of a wireless line sensor 14. For example, a message indicative of a fault may be transmitted to the wireless line sensor collector 20 or the OMS or SCADA system 26 as soon as the fault is detected by the wireless line sensor 14. The failure to transfer or receive such data may be costly and may impact operation of the electric power delivery system 10. The wireless radio repeaters 12 and wireless line sensors 14 may increase a likelihood of a successful transmission, so that control actions may be implemented by the OMS or SCADA system 26 within a desirable period of time relative to the original transmission of the electrical data from a wireless line sensor 14.

In addition, the wireless radio repeaters 12 may be relatively easy to install. Indeed, the wireless radio repeaters 12 may be attached to the distribution lines 18 (e.g., by hanging the wireless radio repeaters 12 on physical power lines), which may be much more cost effective than installing complex cabinetry and/or other structures (e.g., on a power pole). Moreover, coupling a wireless radio repeater 12 to the distribution lines 18 may enable the wireless radio repeater 12 to harvest energy wirelessly from the distribution lines 18. For example, the enclosures of the wireless radio repeater 12 may include a loop that can be placed around one of the distribution lines 18 by which to hang the wireless radio repeater 12, and the loop can also serve as a current transformer. In this capacity, the wireless radio repeater 12 may harvest energy by siphoning a small amount of power via the current transformer. In some cases, the harvested energy may be sufficient to power the wireless radio repeater 12.

Figure 2:
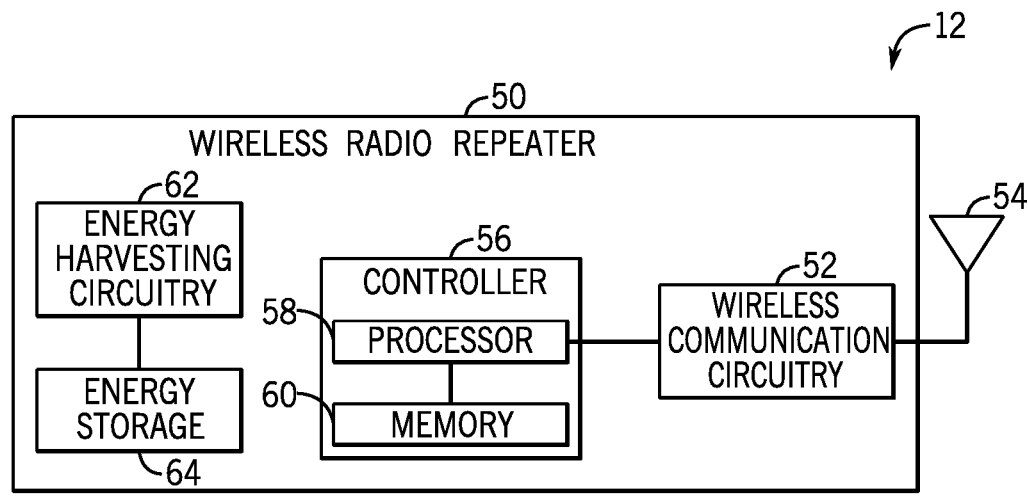
FIG. 2 is a block diagram illustrating various components that are included in a wireless radio repeater, in accordance with an embodiment.

FIG. 2 is a block diagram illustrating various components that may be included in the wireless radio repeater 12 of FIG. 1. In the illustrated embodiment, the wireless radio repeater 12 includes a wireless radio repeater enclosure 50 and wireless communication circuitry 52. The wireless communication circuitry 52 is communicatively coupled to an antenna 54 that is integral and/or attached to the wireless radio repeater 12. In some cases, the wireless radio repeater 12 does not have a separate mounting structure for the integral antenna 54. In those cases, the antenna 54 of the wireless radio repeater 12 may be integrated into the wireless radio repeater 12. The antenna 54 may be specifically designed to detect certain radio frequencies and/or spatial directions. In some cases, the antenna 54 may be omnidirectional (e.g., the wireless radio repeater 12 may receive and/or re-transmit radio signals in many or all directions). In other embodiments, the antenna 54 of the wireless radio repeater 12 may be designed to receive and/or re-transmit radio signals in certain specific directions (e.g., corresponding to directions in which the wireless radio repeater 12 may receive messages from and/or re-transmit messages to in the electric power delivery system 10). Moreover, in some cases, the antenna 54 of the wireless radio repeater 12 may have multiple antenna elements that can be controlled as a phased array to receive and/or re-transmit radio signals in directions selected by the wireless communication circuitry 52 of the wireless radio repeater 12. The wireless radio repeater 12 may communicate with other wireless radio repeaters 12 in the same segment (e.g., the same distribution line 18 of FIG. 1) on which the wireless radio repeater 12 is installed or on different segments. Further, the wireless radio repeater 12 may receive a message in a first wireless channel and then repeat the message in a second wireless channel. The wireless radio repeater 12 may communicate with other wireless radio repeaters 12 on similar sections (e.g., distribution lines 18 of FIG. 1) or on different sections of an electric power delivery system.

The illustrated wireless radio repeater 12 includes a controller 56 (e.g., a microcontroller) that has a processor 58 (e.g. a microprocessor, processing circuitry) and a memory 60. The memory 60 may be any suitable non-transitory, tangible, and computer-readable medium storing instructions that may be executed by the processor 58. One or more processor(s) 58 may operate in concert with the memory 60 to perform a variety of tasks. The memory 60 may represent any suitable article of manufacture that can store instructions executable by the processor 58 and/or data. For example, the memory 60 may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of machine-readable media suitable for storing electronic and/or processor-executable instructions.

Among other things, the processor 58 may operate according to the instructions stored in the memory 60 to receive, analyze (e.g., parse), and/or re-transmit radio signals received from other devices (e.g., wireless line sensors, wireless radio repeaters) on the electric power delivery system 10. Specifically, the processor 58 may receive radio signals from the other devices via the antenna(s) 54. The wireless communication circuitry 52 may include any suitable circuitry to communicate with a corresponding wireless communication system of a wireless line sensor collector 20 or another device that is part of the electric power delivery system 10. For example, the wireless communication circuitry 52 may include suitable radio communication circuitry for communication via a personal area network (PAN), such as Bluetooth or ZigBee, a local area network (LAN), a wireless local area network (WLAN), such as an 802.11x Wi-Fi network, and/or a wide area network (WAN) (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular).

The wireless communication circuitry 52 may include circuitry that enables the wireless radio repeater 12 to receive and/or re-transmit data packets to and/or from other wireless radio repeaters and/or other electronic devices. Also, the wireless communication circuitry 52 may include circuitry that allows the wireless radio repeater 12 to be selective in the radio signals that may be received, analyzed, and/or re-transmitted, such as to filter other sources of radio waves detected by the wireless radio repeater 12. In order for the wireless radio repeater 12 to block repeat of a radio signal that is not received from a device of the electric power delivery system 10 of FIG. 1 (e.g., another wireless radio repeater), for example, the wireless communication circuitry 52 may include circuitry that, in operation, is designed to filter out certain wavelengths (e.g., light wavelengths that are above and/or below one or more wavelength threshold values). In this way, the wireless radio repeater 12 may conserve energy, since the wireless radio repeater 12 does not parse, re-transmit, and/or amplify radio signals that are characterized by a certain range of wavelengths that are in the filter-out range of the wireless communication circuitry 52. Such a filter mechanism may also decrease an amount of false radio signals received at a collection system (e.g., the wireless line sensor collector 20 or the OMS or SCADA 26 of FIG. 1).

In some embodiments, the wireless radio repeater 12 may receive data packets or analyze data packets that are of a certain radio wave frequency. The wireless radio repeater 12 may receive data packets that include the electrical measurements and are characterized by a first frequency (e.g., a first frequency band), and then re-transmit the data packets at a second frequency (e.g., a second frequency band). In some cases, the wireless radio repeater 12 may re-transmit received radio signals in the analog domain received at a certain desired frequency (e.g., the frequency used by an electrical measurement device). In other cases, the wireless radio repeater 12 may parse the digital data contained in the messages of the radio signals and re-transmit the digital data, which may result in fewer transmission errors, as analog noise may be partially removed in this way. Moreover, additional digital information may be included in the re-transmitted signal to indicate that the wireless radio repeater 12 has re-transmitted the signal (e.g., a device identification number of the wireless radio repeater 12, a timestamp of the time that the signal was originally received and/or re-transmitted).

The message that is received and/or re-transmitted by the wireless radio repeater 12 may be encrypted using any suitable encryption techniques. In some cases, the wireless radio repeater 12 may decrypt the message received from another device on the electric power delivery system 10 before re-transmitting the message. This may enable the wireless radio repeater 12 to determine, for example, of the manner in which the message is to be re-transmitted (e.g., if there are multiple control systems, which one; what frequency to use to re-transmit the message; a particular spatial direction to direct the antenna 54). If the message is decrypted and parsed by the wireless radio repeater 12, the wireless radio repeater 12 may or may not re-encrypt the message for re-transmission. When the message is re-encrypted, the wireless radio repeater 12 may use the same encryption key and/or technique or a different encryption key and/or technique before re-transmitting the message.

The wireless radio repeater 12 may primarily obtain power to operate via energy harvesting circuitry 62. The energy harvesting circuitry 62 may harvest energy from the distribution line where the wireless radio repeater 12 is located. Most distribution lines are not enclosed, so a wireless radio repeater 12 may be attached or clamped to a distribution line via any suitable coupling. The wireless radio repeater 12 may use an inductive coil to siphon a small amount of current transmitted through the distribution line. The wireless radio repeater 12 may store the energy that the wireless radio repeater 12 harvests using any suitable energy storage 64. The energy storage 64 may include, for example, a capacitor, a supercapacitor, a battery, a flywheel, or any other suitable form of storage. Although the amount of energy harvested by the energy harvesting circuitry 62 represents a negligible amount of energy supplied by the electric power delivery system 10 of FIG. 1 as a whole, by gradually filling the energy storage 64 via energy harvested from the distribution line, the wireless radio repeater 12 may store enough energy to perform numerous tasks. For example, the wireless radio repeater 12 may use the energy to operate the wireless communication circuitry 52.

The wireless radio repeater 12 may also use energy from other sources to provide energy when the distribution line that the wireless radio repeater 12 is coupled (e.g., attached or clamped) to does not have sufficient current flow for a long enough time to limit accumulation of energy in the energy storage 64. For example, if the distribution line does not have enough power to enable the wireless radio repeater 12 to operate within operational limits, power may be harvested from other (e.g., secondary) sources, such as solar energy, kinetic energy from a motion of the distribution line that the wireless radio repeater 12 is connected to, an emergency battery, or another suitable energy source 12. In this way, the wireless radio repeater 12 may re-transmit alerts even when the distribution line on which the wireless radio repeater 12 is mounted does not have sufficient current.

Since power that may run to the wireless radio repeater 12 is primarily harvested from the distribution line via induction, equipment to step down the voltage of the distribution line to power the wireless radio repeater 12 may be avoided. Moreover, when the wireless radio repeater 12 does not include wiring to a separate antenna or power source, electrical surge protection for the wireless radio repeater 12 may also be avoided. In this way, the wireless radio repeater 12 offers an efficient method to re-transmit messages (e.g., radio signals of data packets) that include electrical measurements to other communication nodes (e.g., other wireless radio repeaters), thereby avoiding expensive structural elements (e.g., cabinetry, standalone structures). However, the wireless radio repeaters 12 may, in some cases, be installed using such separate structural elements.

Figure 3:
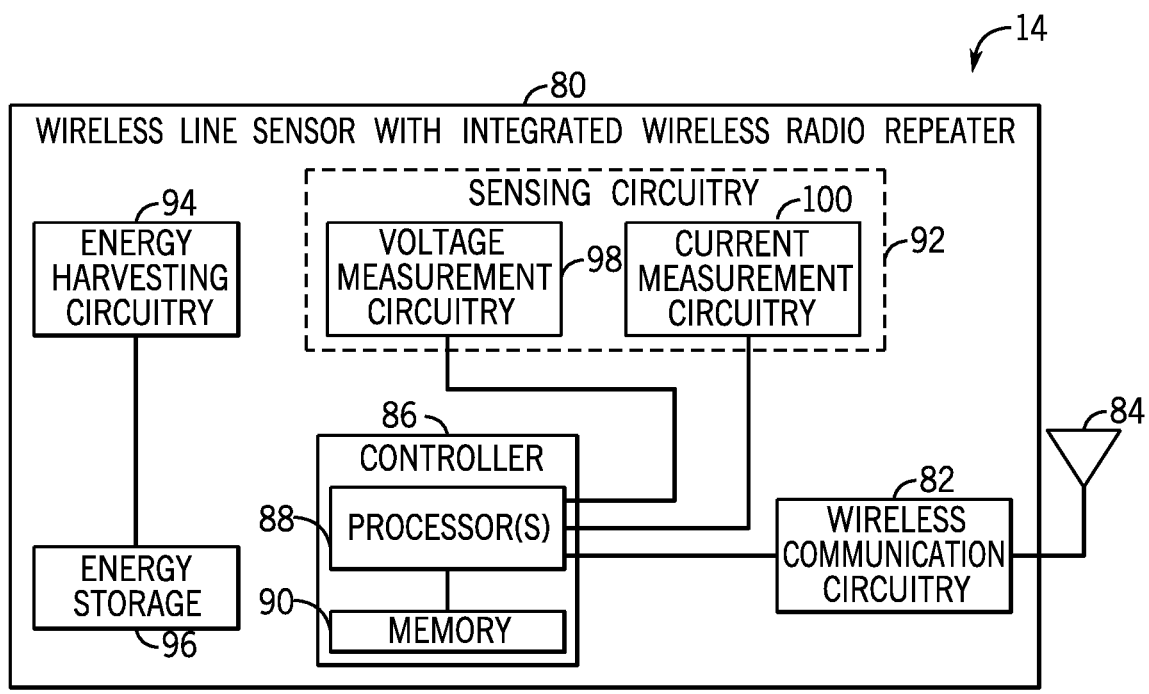
FIG. 3 is a block diagram illustrating various components that are included in a wireless line sensor having an integrated radio repeater, in accordance with an embodiment.

FIG. 3 is a block diagram of a wireless line sensor 14 of FIG. 1 having an integrated wireless radio repeater. Indeed, the wireless line sensors 14 of FIG. 1 may or may not include integrated wireless radio repeater capabilities. In the illustrated embodiment, the wireless line sensor 14 of FIG. 3 includes wireless radio repeater capabilities. As shown, the wireless line sensor 14 includes a wireless line sensor enclosure 80 and wireless communication circuitry 82. The wireless communication circuitry 82 may operate an antenna 84. The wireless communication circuitry 82 and the antenna 84 may operate in the same or a similar manner as the wireless communication circuitry 52 and antenna 54 discussed above with reference to FIG. 2. In this way, the wireless line sensor 14 may be understood to have integrated wireless radio repeater capabilities (e.g., capabilities of the wireless radio repeater 12).

The wireless line sensor 14 includes a controller 86 (e.g., a microcontroller) that has a processor 88 (e.g. processing circuitry, a microprocessor) and a memory 90. The memory 90 may be a non-transitory, tangible, and computer-readable medium storing instructions that may be executed by the processor 88. Specifically, one or more processor(s) 88 may operate in concert with memory 90 to perform a variety of tasks. The memory 90 may represent any suitable article of manufacture that can store instructions executable by the processor 88 and/or data. For example, the memory 90 may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of machine-readable media suitable for storing electronic and/or processor-executable instructions.

Among other things, the processor 88 may operate according to these instructions to transmit electrical measurements obtained by sensing circuitry 92 (e.g., electrical measurement circuitry), which is discussed further below. The processor 88 may analyze the electrical measurements obtained by the sensing circuitry 92 and determine a frequency at which to transform or parse the electrical measurement data into a message (e.g., data packets in a message) that may be transmitted by the wireless communication circuitry 82. The processor 88 may additionally or alternatively receive, analyze (e.g., parse), and/or re-transmit radio signals received from other devices (e.g., wireless line sensors 14, wireless radio repeaters 12). The wireless communication circuitry 82 may include any suitable circuitry to communicate with a corresponding wireless communication system of a wireless line sensor collector 20 or another device of the electric power delivery system 10 of FIG. 1. For example, the wireless communication circuitry 82 may include suitable radio communication circuitry for communication via PAN, LAN, WLAN, and/or WAN.

The wireless line sensor 14 may primarily obtain power to operate via energy harvesting circuitry 94. The energy harvesting circuitry 94 may harvest energy from the distribution line where the wireless line sensor 14 is located. Most distribution lines are not enclosed, so a wireless line sensor 14 may be attached or clamped to a distribution line via any suitable coupling. The wireless line sensor 14 may syphon a small amount of current using an inductive coil. The wireless line sensor 14 may store the energy harvests using any suitable energy storage 96. The energy storage 96 may include, for example, a capacitor, a supercapacitor, a battery, a flywheel, or any other suitable form of storage. Although the amount of energy harvested by the energy harvesting circuitry 94 represents a negligible amount of energy supplied by the electric power delivery system 10 as a whole, by gradually filling the energy storage 96 via energy harvested from the distribution line, the wireless line sensor 14 may store enough energy to perform numerous tasks. For example, the wireless line sensor 14 may use the energy to operate the wireless communication circuitry 82. Also, the wireless line sensor 14 may use the energy that the wireless line sensor 14 harvests to operate the sensing circuitry 92, such as voltage measurement circuitry 98 and/or current measurement circuitry 100. The voltage measurement circuitry 98 may use one or more capacitive elements to estimate voltage on a distribution line. The capacitive elements may step down the voltage on the distribution line to a level that can be measured by a metering circuit of the voltage measurement circuitry 98. The current measurement circuitry 100 may include a coil that may be looped around the distribution line when the wireless line sensor 14 is clamped around the distribution line. The current measurement circuitry 100 may measure the resulting electrical current induced in the coil using metering circuitry; the induced current is proportional to the current flowing through the distribution line.

The wireless line sensor 14 may also use energy from other sources to provide energy when the distribution line that the wireless line sensor 14 is coupled (e.g., attached or clamped) to does not have sufficient current flow for a long enough time to limit accumulation energy in the energy storage 96. For example, if the distribution line does not have enough power enable the wireless line sensor 14 to operate within operational limits, power may be harvested from other (e.g., secondary) sources such as solar energy, kinetic energy from a motion of the distribution line the wireless line sensor is connected to, an emergency battery, or another energy source. In this way, the wireless line sensor 14 may be powered to transmit and/or re-transmit alerts (e.g., data packets indicative of electrical measurements) even when the distribution line to which the wireless line sensor 14 is mounted does not have sufficient current. As an example, the wireless line sensor 14 may sample electrical measurements even when the distribution line to which the wireless line sensor 14 is mounted is not receiving power. Such a case may indicate that the distribution line is "dead" and/or that a fault may exist near the distribution line. In this case, it is desirable for the wireless line sensor 14 to transmit alerts indicating the lack of power in the pertinent location, and to re-transmit (e.g., repeat) alerts received from other electronic devices located on other sections of the electric power delivery system. Indeed, such a continuous transmission may allow a central source that analyzes the alerts to isolate a location of a fault and perform control actions at the isolated location, for example. The wireless line sensor 14 may access other energy harvesting sources to continue to operate, detect the current or voltage in the distribution line, and/or transmit or re-transmit alerts having data originating at the wireless line sensor 14 or at another electrical measurement device (e.g., another wireless line sensor).

Figure 4:
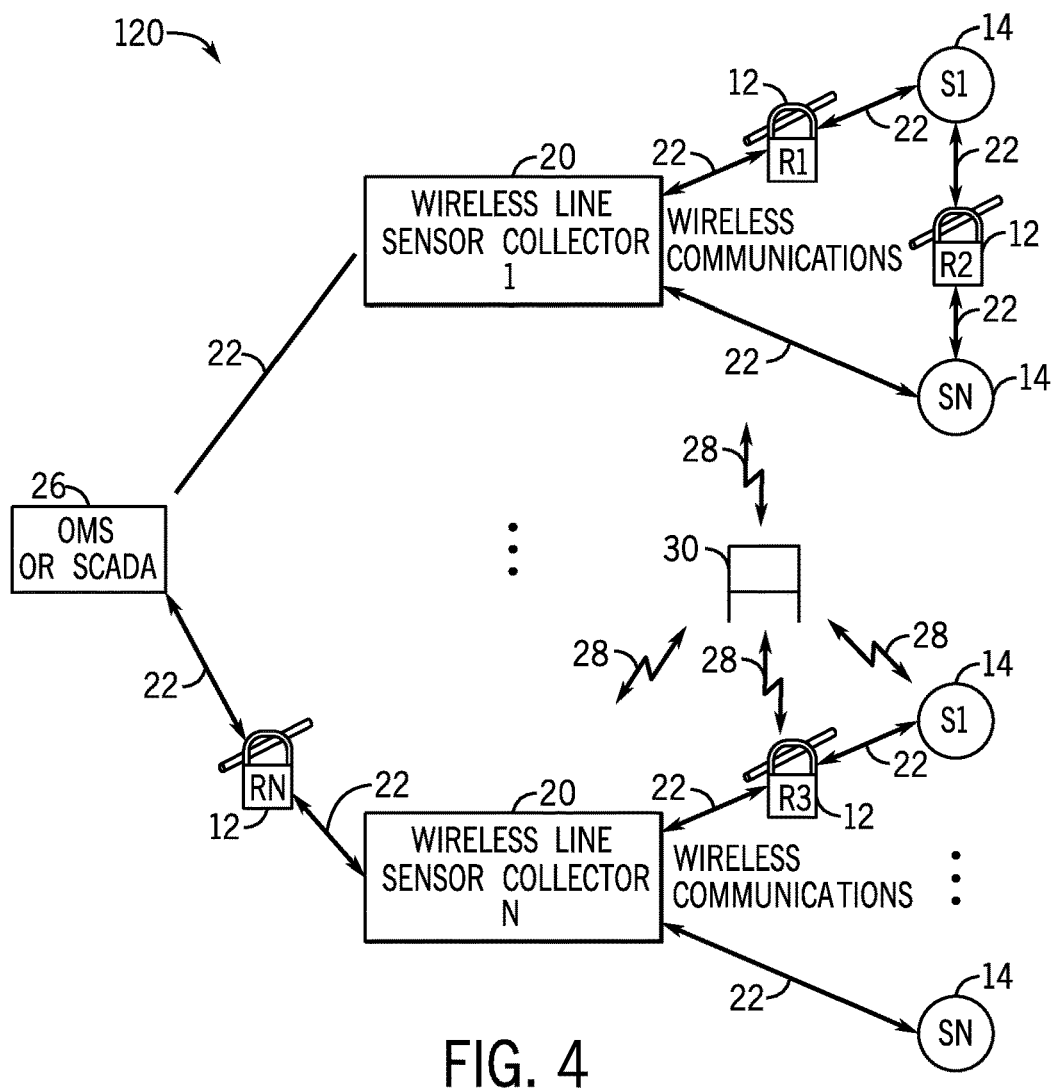
FIG. 4 is a simplified architectural view of communication between components of an electric power delivery system using wireless radio repeaters, in accordance with embodiment.

FIG. 4 is a simplified architectural view of communication between nodes of an electrical delivery communication network 120 (e.g., a communication network) of an electric power delivery system using wireless radio repeaters 12 to aid in the communication. In particular, FIG. 4 is a diagram of the relationship between the Outage Management System (OMS) or Supervisory Control and Data Acquisition (SCADA) system 26, wireless line sensor collectors 20, wireless radio repeaters 12, and wireless line sensors 14. The Outage Management System (OMS) or Supervisory Control and Data Acquisition (SCADA) system 26 may communicate with some number of wireless line sensor collectors 20 using the radio signals 22 or a wired communication medium (not shown). Here, there are shown to be "N" wireless line sensor collectors 20 labeled 1 . . . N. Each wireless line sensor collector 20 may communicate with some number of wireless line sensors 14 via the radio signals 22. Here, there are also shown to be "N" wireless line sensors 14 labeled S1 . . . SN for each wireless line sensor collector 20. However, the particular number "N" of wireless line sensors 14 may or may not be the same as the number "N" of wireless line sensor collectors 20. Moreover, there may be a different number "N" wireless line sensors 14 per each wireless line sensor collector 20.

Disposed between communication nodes of the electrical delivery communication network 120 are wireless radio repeaters 12 that receive and re-transmit radio signals 22 to and/or from the OMS or SCADA 26, wireless line sensor collectors 20, and/or wireless line sensors 14. Specifically, the wireless radio repeaters 12 are disposed in strategic locations so as to minimize an amount of obstacles that would decrease or attenuate a strength of a radio signal 22 that is transmitted on the electrical delivery communication network 120. Indeed, it may be preferable for wireless radio repeaters 12 to have line of sight communication paths with communication nodes on any side of the wireless radio repeater 12 to increase a reliability of transmission of data packets having the electrical measurement data on the electrical delivery communication network 120. Any number of wireless radio repeaters 12 may be included in the electrical delivery communication network 120.

By strategically placing the wireless radio repeaters 12 in locations that optimize line of sight usage, a threshold percentage of successful transmissions may be increased. The threshold percentage may be, for example, from 50% to 75%, 60 to 80%, or from 75% to 99%. Also, the data packets transmitted by nodes of the electrical delivery communication network 120 may arrive at a desired location with less distortion and/or attenuation than if the wireless line sensor 14 and/or wireless line sensor collector 20 transmit data packets without wireless radio repeaters 12, because the data packets may not be attenuated as much as compared to an attempted transmission through an obstacle. Thus, control actions may be taken sooner and/or more appropriately, since the data packets may arrive at the intended destination in a reliable and/or timely manner. For example, a fault may be identified in a specific location along the electric power delivery system. A wireless line sensor 14 may detect current and/or voltage measurements indicative of the fault, but may not be able to reliably transmit data packets having the current and/or voltage measurements to the wireless line sensor collector 20. A low cost wireless radio repeater 12 may be strategically placed such that the low cost wireless radio repeater 12 has a line of sight view the wireless line sensors 14 and with the wireless line sensor collector 20 or another wireless radio repeater that has a line of sight communication path with the wireless line sensor collector 20. The wireless line sensors 14 may send the data packets to the wireless radio repeater 12, which may, in response, re-transmit the data packets to the wireless line sensor collector 20 and/or another wireless radio repeater 12 with which the wireless line sensor collector 20 may have a line of sight communication path. This process of transmission may continue until the data packets arrive at the wireless line sensor collector 20 or another centralized location (e.g., the OMS or SCADA 26). In this way, obstacles that would otherwise impede a successful transmission of the data packets may be reduced or avoided.

Further, in the depicted embodiment, concentrations of interfering radio signals 28 may occur near communication nodes of the electrical delivery communication network 120. In particular, the interfering radio signals 28 (e.g., interference signals) are being transmitted and/or received by the radio signal source 30. Although the depicted embodiment illustrates a single radio signal source 30, multiple radio signal sources 30 may be present around various locations of the communication nodes of the electrical delivery communication network 120. The interfering radio signals 28 may cause disruptions in successful reception of the radio signals 22 at the communication nodes. To mitigate the negative effects of the interfering radio signals 28, the wireless line repeaters 12 may boost or amplify (e.g., via an amplifier) the radio signals 22 to increase successful reception of the radio signals 22 in the presence of the undesirable interfering radio signals 28. Boosting the radio signals 22 may increase successful reception of the radio signals 22 with a communication node of the electrical delivery communication network 120 that is near the interfering radio signals 28. The wireless radio repeater 12 may also selectively repeat messages, resulting in greater connectivity and reception amongst devices of the electrical delivery communication network 120. In some embodiments, the wireless radio repeater 12 may be located in a threshold distance to a communication node. At the threshold distance, the wireless radio repeater 12 may boost the radio signals 22 so that an intended receiver of the radio signals 22 may discern the radio signals 22 from the interfering radio signals 28.

Each of FIGS. 5-7 described below illustrates a method associated with operation of a wireless radio repeater, which may be a standalone wireless radio repeater or a device (e.g., the wireless line sensor 14) that has an integrated wireless repeater. In some embodiments, each of the methods may be performed by a single respective component or system, such as by the controller 56 (e.g., the processor 58) or the controller 86 (e.g., the processor 88). In additional or alternative embodiments, multiple components or systems may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 5:
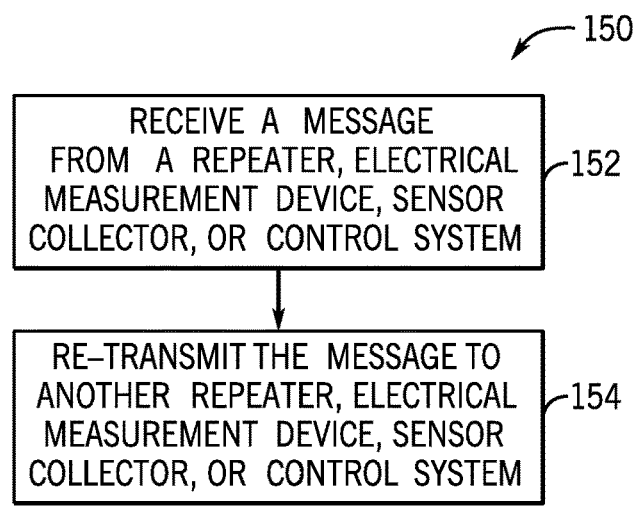
FIG. 5 is a flowchart of a method for receiving and re-transmitting a message via a wireless radio repeater, in accordance with an embodiment.

FIG. 5 is a flowchart of a method 150 for receiving and re-transmitting a message (e.g., an electrical measurement message, a wireless message) via a wireless radio repeater, in accordance with an embodiment. The method 150 begins with receiving a message (e.g., radio signals including data packets) from a wireless radio repeater, wireless line sensor (e.g., an electrical measurement device), wireless line sensor collector, IED, and/or control system (block 152). The message may be received at a specific frequency (e.g., frequency band) and/or from a specific spatial direction at which the wireless radio repeater is tuned to listen. The wireless radio repeater may then re-transmit the message to another repeater, wireless line sensor collector, electrical measurement device, IED, and/or control system (block 154). For example, the wireless radio repeater may amplify and re-transmit the message to enable the message to be detected by a wireless line sensor collector, OMS or SCADA system, IED, and/or another wireless radio repeater (e.g., a standalone wireless radio repeater, a wireless line sensor with radio repeater capabilities).

In some cases, the wireless radio repeater may receive the message at a first frequency (e.g., a first frequency band) and may re-transmit the message at a second frequency (e.g., a second frequency band). Likewise, the wireless radio repeater may receive the message from a first spatial direction (e.g., as sensed on a phased array of antenna elements or a first directional antenna) and may re-transmit the message toward a second spatial direction (e.g., as transmitted via a phased array of antenna elements or a second directional antenna). The particular second frequency or second spatial direction may be fixed (e.g., programmed during installation) or may be dynamic (e.g., depending on the first spatial direction in which the message was received, the electrical measurement device from which the message was received, the type of electrical measurement of the message). A wireless radio repeater may additionally or alternatively be tuned to re-transmit data packets at different frequencies and/or in different spatial directions based on attributes of the messages (e.g., the first frequency, content of the message). For example, a message may include an alert of a particular type, and the second frequency or spatial direction may be selected based on the characteristics of the alerts.

Figure 6:
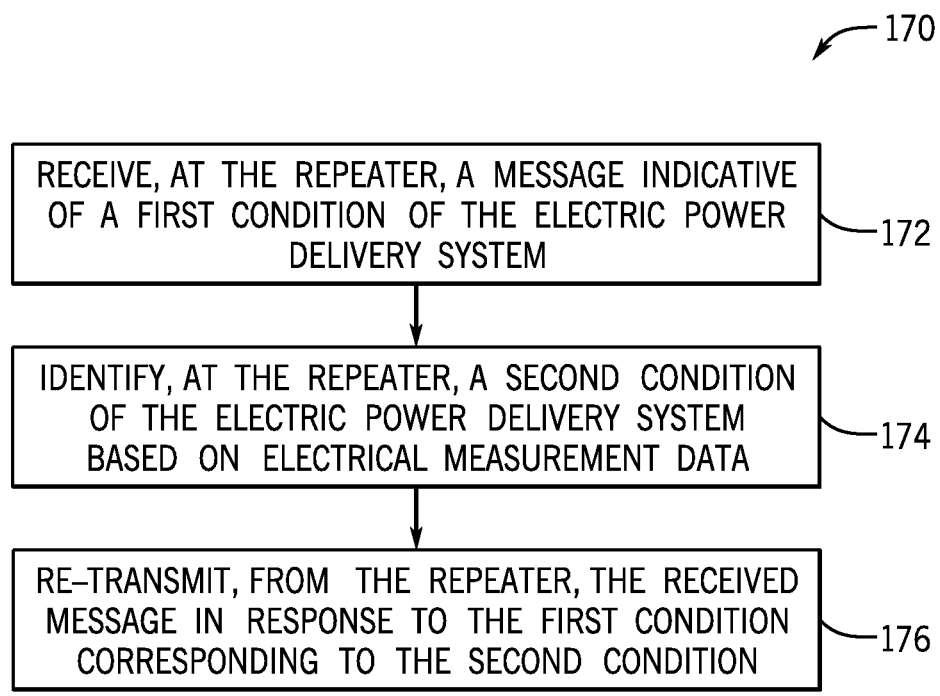
FIG. 6 is a flowchart of a method for verifying a message via a wireless radio repeater, in accordance with an embodiment.

FIG. 6 is a flowchart of a method 170 for verifying a message (e.g., an electrical measurement message, a wireless message) via a wireless radio repeater, in accordance with an embodiment. The method 170 begins with receiving a message indicative of a first condition of the electric power delivery system, such as from another repeater, a wireless line sensor collector, electrical measurement device, an IED, and/or control system (block 172). For example, the wireless radio repeater may receive the message via the procedure performed with respect to block 152 of FIG. 5. In response or in parallel to receiving the message, the wireless radio repeater may receive electrical measurement data associated with the electric power delivery system 10. As an example, a standalone wireless radio repeater may receive the electrical measurement data from another wireless radio repeater and/or a wireless line sensor. As another example, a wireless radio repeater integrated into a wireless line sensor may receive the electrical measurement data via integrated sensing circuitry. The wireless radio repeater may identify a second condition of the electric power delivery system based on the received electrical measurement data (block 174).

The wireless radio repeater may then compare the first condition indicated by the message and the second condition identified based on the electrical measurement data. In response to determining that the first condition corresponds to (e.g., matches) the second condition, the wireless radio repeater may re-transmit the received message, such as to a wireless line sensor collector, OMS or SCADA system, IED, and/or another wireless radio repeater (block 176). For instance, the wireless radio repeater may re-transmit the message via the procedure performed with respect to block 156 of FIG. 5. Thus, the wireless radio repeater may corroborate or verify the condition indicated by the received message to re-transmit the message. As an example, the wireless radio repeater may receive a message indicative of a voltage change (e.g., effectuated by an IED controlling a voltage regulator), the wireless radio repeater may verify the message based on electrical measurement data indicative that the voltage has changed in the manner indicated by the message, such as based on a change in angle between voltage and current waveforms. By way of example, the condition being determined via the method 170 may include a fault condition, such as an overcurrent, low current, sudden change in voltage or current, low voltage, sudden change in phase between voltage and current, a harmonic issue, and so forth. It may be desirable to confirm that the electrical measurement data is consistent with the fault condition to enable a suitable control action to be performed to mitigate the fault condition. For instance, there may be a plurality of control actions associated with addressing different fault conditions, and verifying the message and re-transmitting the verified message may enable a particular one of the control actions to be appropriately selected to address the fault condition. Additionally or alternatively, the condition being determined via the method 170 may include an operating condition or status (e.g., an instantaneous voltage of current), and there may be a plurality of control actions associated with improving a particular operating condition, such as to improve efficient operation to deliver power. Thus, verifying the condition may enable an appropriate control action to be performed to improve operation of the electric power delivery system.

Additionally, in response to a determination that the first condition does not correspond to the second condition, the wireless radio repeater may block re-transmission of the received message. For instance, the message may not reflect the electrical measurement data received by the wireless radio repeater (e.g., the message may be transmitted based on other electrical measurement data, the message may have been falsified, the message may be inaccurately transmitted), and the first condition indicated by the message therefore may not correspond to the second condition indicated by the electrical measurement data. As such, the wireless radio repeater may avoid re-transmitting received messages that do not pertain to the electrical measurement data received by the wireless radio repeater. Indeed, blocking re-transmission of such messages may block subsequent performance of a control action (e.g., selecting a control action from a plurality of control actions that addresses different fault conditions or that improves different operating conditions) that may not improve operation of the electric power delivery system (e.g., to mitigate a presently occurring fault condition, to improve efficient operation of the electric power delivery system).

It should be noted that other devices of the electric power delivery system 10 may also receive the message, verify the condition indicated by the message, and operate according to the message in response to verifying the condition. By way of example, the IED may receive the message indicative of the first condition, receive electrical measurement data to identify a second condition, and determine whether an action is to be performed based on the second condition. Indeed, the IED may perform the action (e.g., to block a current flow through a portion of the electric power delivery system), which may address the first condition (e.g., an overcurrent condition), in response to the second condition corresponding to the first condition. The IED may also block the action from being performed in response to a determination that the second condition does not correspond to the first condition. As such, a resultant action may be performed more appropriately by the IED in response to the message.

Figure 7:
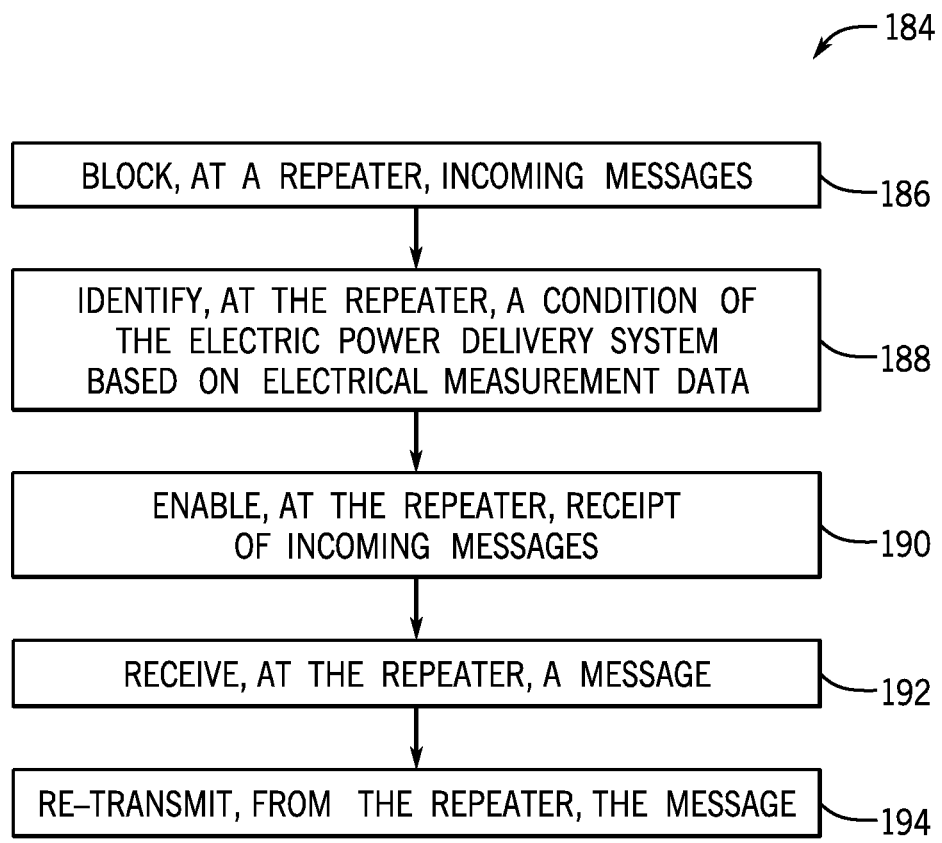
FIG. 7 is a flowchart of a method for verifying a message via a wireless radio repeater, in accordance with an embodiment.

FIG. 7 is a flowchart of a method 184 for verifying a message via a wireless radio repeater, in accordance with an embodiment. The method 184 begins with blocking receipt of incoming messages that may be transmitted from another repeater, a wireless line sensor collector, an electrical measurement device, an IED, and/or a control system, such as by operating in a closed configuration (block 186). While blocking receipt of incoming messages, the wireless radio repeater may receive and process electrical measurement data. For example, the wireless radio repeater may continually receive and process the electrical measurement data to determine whether there is a condition associated with the electric power delivery system. Based on the electrical measurement data, the wireless radio repeater may identify a condition of the electric power delivery system (block 188). In response to identifying the condition (e.g., a fault condition, an operating condition), the wireless radio repeater may enable receipt of incoming messages, such as by operating in an open configuration (block 190).

While operating in the open configuration, the wireless radio repeater may receive a message from another device of the electric power delivery system (block 192). For example, the wireless radio repeater may receive the message via the procedure performed with respect to block 152 of FIG. 5. At block 194, the wireless radio repeater may re-transmit the message, such as to another wireless radio repeater, wireless line sensor collector, electrical measurement device, IED, and/or control system. For instance, the wireless radio repeater may re-transmit the message via the procedure performed with respect to block 154 of FIG. 5. In some embodiments, the wireless radio repeater may operate in the open configuration for a threshold period of time after identifying the condition of the electric power delivery system based on the electrical measurement data and transition to the closed configuration to block receipt of incoming messages after the threshold period of time has elapsed. Thus, the wireless radio repeater may block receipt and subsequent re-transmission of a message that is not received within the threshold period of time during which the wireless radio repeater operates in the open configuration. Additionally or alternatively, the wireless radio repeater may transition from the open configuration to the closed configuration in response to the condition no longer being identified based on the electrical measurement data. For example, a user (e.g., a technician, an operator) may adjust the operation of the electric power delivery system to mitigate the condition, and subsequently received electrical measurement data may therefore indicate that the condition is no longer present or occurring.

In either case, the wireless radio repeater may block receipt of messages that may no longer be relevant or timely with respect to recently received electrical measurement data. As an example circumstance, a fault condition indicated by a message may have already been addressed (e.g., by a user, by another device) prior to the wireless radio repeater receiving the message. Thus, it may no longer be desirable to perform a control action to address the resolved fault condition. As another example circumstance, an operating condition indicated by a message may no longer be relevant (e.g., due to changes in operation of other devices) by the time the wireless radio repeater receives the message. As such, a control action that would have been performed in response to the message may no longer improve operation of the electric power delivery system. Transitioning from the open configuration to the closed configuration may further block erroneous messages (e.g., messages that falsely indicate a fault) from being undesirably received and/or re-transmitted through the electric power delivery system, thereby improving actions performed in response to a received message. By limiting receipt of incoming messages specifically to when the condition has been identified, the wireless radio repeater may reduce a number messages being processed and transmitted, thereby reducing energy consumption, processing power, interference of messages, and so forth.

In additional or alternative embodiments in which the message may indicate an additional condition of the electric power delivery system, the wireless radio repeater may compare the condition identified based on the electrical measurement data and the additional condition indicated by the message in response to receiving the message while operating in the open configuration. The wireless radio repeater may re-transmit the received message in response to the conditions corresponding to (e.g., matching) one another. Additionally, the wireless radio repeater may block re-transmission of the received message in response to a determination that the conditions do not correspond to one another. Thus, the wireless radio repeater may also corroborate messages received while operating in the open configuration.

Other devices of the electric power delivery system 10 may also transition between an open configuration and a closed configuration to receive or block, respectively, incoming messages to perform a corresponding action. Indeed, the other device, such as the IED, may receive electrical measurement data and monitor for a condition based on the electrical measurement data. The other device may operate in the closed configuration to block receipt of incoming messages while the condition is not identified based on the electrical measurement data. However, the other device may operate in the open configuration to enable receipt of incoming messages in response to identifying the condition. During operation in the open configuration, the other device may receive a message and perform an action (e.g., to block current flow through a portion of the electric power delivery system) in response to receipt of the message. In some embodiments, the other device may also corroborate a message received while operating in the open configuration to verify that the condition indicated by the message corresponds to an identified condition to determine whether an action is to be performed. The other device may further transition from the open configuration to the closed configuration after a threshold period of time has elapsed and/or in response to a determination that the condition is no longer being identified based on the electrical measurement data. As such, the other device may perform an action more appropriately.

Figure 8:
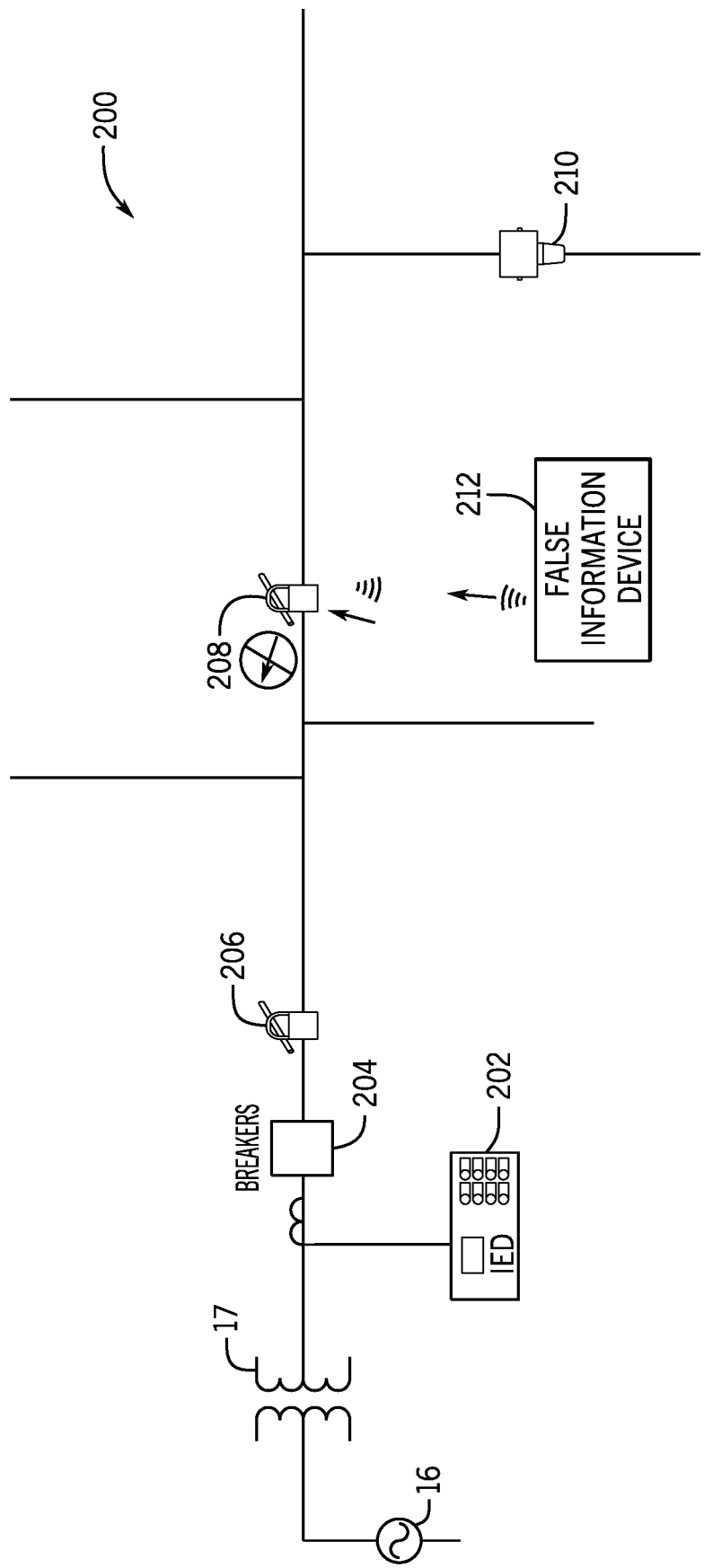
FIG. 8 is a schematic diagram of an electric power delivery system with wireless radio repeaters, in accordance with an embodiment.

FIG. 8 is a schematic diagram of an electric power delivery system 200 with wireless radio repeaters, in accordance with an embodiment. The illustrated electric power delivery system 200 may, for example, include a portion of the electric power delivery system 10 of FIG. 1. The electric power delivery system 200 may include the generator 16, the transformer 17, and an IED 202. The IED 202 may control operation of certain devices to perform operations of the electric power delivery system 200. For example, the IED 202 may be used for protection, control, automation, and/or monitoring of equipment in the electric power delivery system 200, such as to monitor electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment. In some embodiments, the IED 202 may be a relay (e.g., a remote terminal unit, a differential relay, a distance relay, a directional relay, a feeder relay, an overcurrent relay, a voltage regulator control, a voltage relay, a breaker failure relay, a generator relay, a motor relay) that enables or blocks electrical power flow between other devices of the electric power delivery system 200. The IED 202 may, for instance, communicate with a computing device, and the IED 202 may operate based on the communication with the computing device (e.g., based on a user input). In the illustrated embodiment, the IED 202 is communicatively coupled to a breaker 204 and may communicate with the breaker 204 to open and close to enable or block, respectively, flow of electrical power through a portion of the electric power delivery system 200. The IED 202 may additionally or alternatively include another suitable device, such as an automation controller, a bay controller, a meter, a recloser control, a communications processor, a computing platform, a programmable logic controller (PLC), a programmable automation controller, an input and output module, and the like. Indeed, the IED 202 may transmit data, such as operating information and/or sensor data, to control functions of other devices of the electric power delivery system 200 and facilitate operation of the electric power delivery system 200. Additionally, it should be noted that the IED 202 may include an individual IED or a system that includes multiple IEDs.

The electric power delivery system 200 may include wireless radio repeaters that re-transmit messages, such as messages received from another wireless radio repeater, the IED 202, a wireless line sensor, and/or a wireless line sensor collector. By way of example, a first wireless radio repeater 206 may receive a message from the IED 202 and may re-transmit the message (e.g., as radio signals). A second wireless radio repeater 208 may receive the message from the first wireless radio repeater 206 and may re-transmit the message again, such as toward another wireless radio repeater, wireless line sensor collector, electrical measurement device, IED, OMS or SCADA system, and/or control system. Additionally or alternatively, a wireless line sensor 210 may detect a condition of the electric power delivery system 200 and transmit a message indicative of the condition to the second wireless radio repeater 208, and the second wireless radio repeater 208 may receive the message and re-transmit the message to the first wireless radio repeater 206, which may re-transmit the message to the IED 202 to perform an action.

In certain embodiments, the wireless radio repeaters 206, 208 may also verify received messages. For instance, each of the wireless radio repeaters 206, 208 may perform the method 170 and/or the method 184 to re-transmit a received message. Thus, the wireless radio repeaters 206, 208 may block re-transmission of certain messages. By way of example, in the illustrated embodiment, a false information device 212 may attempt to transmit a message (e.g., a message falsified or forged by the false information device 212, a message initially transmitted by another wireless radio repeater and modified by the false information device 212) to the second wireless radio repeater 208 for re-transmission in the electric power delivery system 200. However, the false information device 212 may not be able to accurately identify a condition (e.g., a fault condition, an operating condition) of the electric power delivery system 200 (e.g., the false information device 212 may not be able to receive and/or process electrical measurement data associated with the electric power delivery system 200), and the message transmitted by the false information device 212 therefore may not accurately indicate the condition of the electric power delivery system 200. Thus, the second wireless radio repeater 208 may block re-transmission of the message transmitted from the false information device 212.

To this end, the second wireless radio repeater 208 may receive the message from the false information device 212 and, in response, determine whether the condition indicated by the message is present in the electric power delivery system 200. For example, the second wireless radio repeater 208 may process electrical measurement data (e.g., electrical measurement data detected via received current, electrical measurement data received via the wireless line sensor 210) and determine whether the electrical measurement data also indicates the condition of the electric power delivery system 200. In response to a determination that the condition indicated by the message is not present, the second wireless radio repeater 208 may block re-transmission of the message received from the false information device 212. In additional or alternative embodiments, the second wireless radio repeater 208 may operate in the closed configuration while the condition has not been identified, and the false information device 212 may transmit the message during operation of the second wireless radio repeater 208 in the closed configuration. As a result, the second wireless radio repeater 208 may not receive the message transmitted by the false information device 212 and therefore may not re-transmit the message. In either embodiment, the message transmitted by the false information device 212 is not re-transmitted via the second wireless radio repeater 208 and therefore may not be transmitted to other devices (e.g., the first wireless radio repeater 206, the IED 202) of the electric power delivery system 200. As such, the second wireless radio repeater 208 may block undesirable operation of the electric power delivery system 200 (e.g., of the IED 202) based on the message transmitted by the false information device 212.

Figure 9:
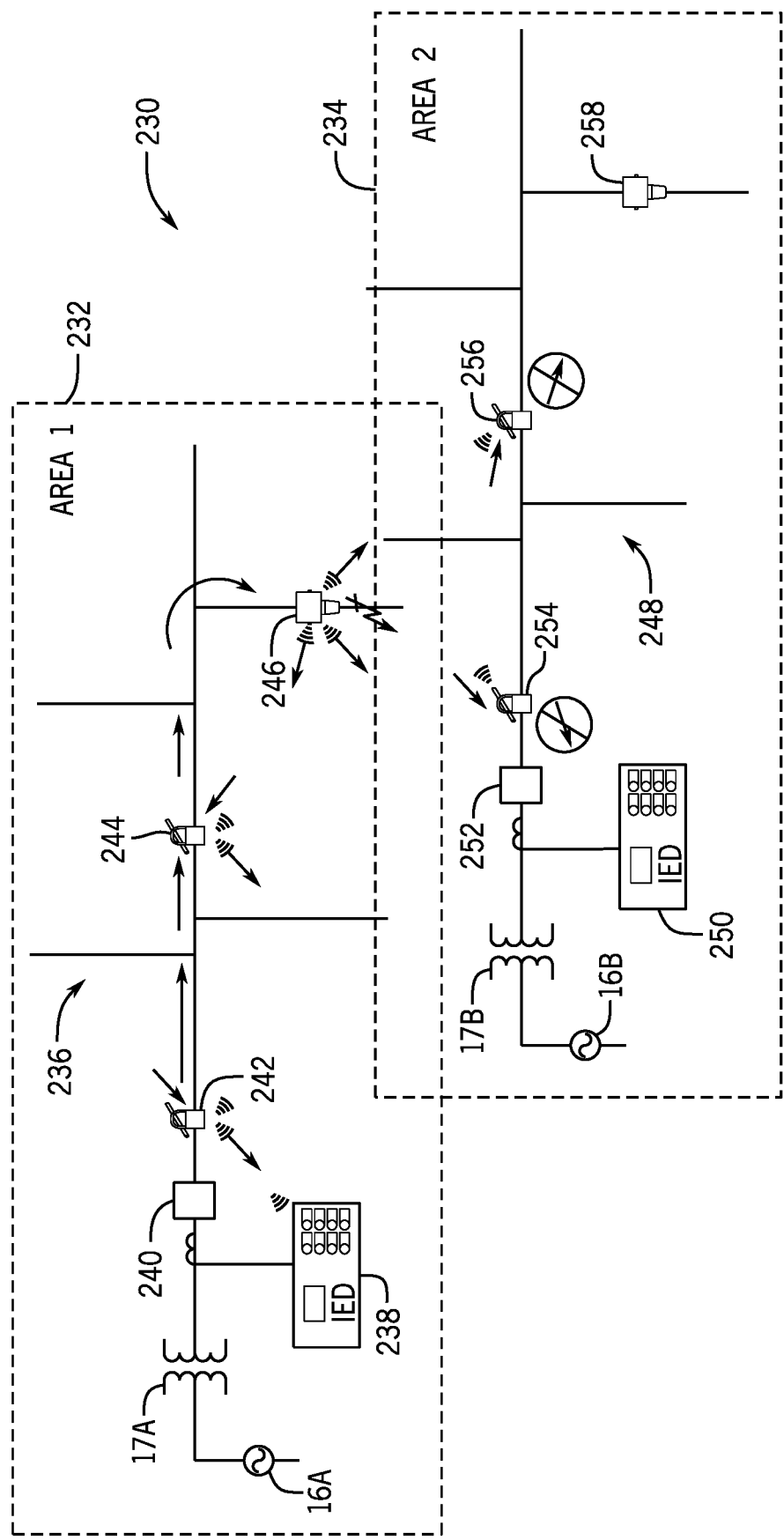
FIG. 9 is a schematic diagram of an electric power delivery system with different areas incorporating respective wireless radio repeaters, in accordance with an embodiment.

FIG. 9 is a schematic diagram of an electric power delivery system 230 (e.g., a portion of the electric power delivery system 10 of FIG. 1) with different areas or sections incorporating respective wireless radio repeaters. As an example, the different areas may include electrical subsystems, each with a respective set of devices, such as distribution lines, generators, transformers, breakers, IEDs, wireless line sensors, in addition to the respective wireless radio repeaters. Indeed, each area may be proximate to one another and/or may share or include a common geographical location, but the areas may not be electrically coupled to one another and may therefore include different conditions, properties, electrical measurements, and so forth. For example, the areas may operate independently of one another to deliver electrical power, and/or each area may be electrically isolated from one another. As such, it may be desirable to block a message relevant to one of the areas from being transmitted or re-transmitted to devices of another area that is not relevant to the message. To this end, the respective wireless radio repeaters may verify a condition associated with its corresponding area.

By way of example, the illustrated electric power delivery system 230 includes a first area 232 and a second area 234. The first area 232 may include first distribution lines 236, as well as a first generator 16A, a second transformer 17A, a first IED 238, a first breaker 240, a first wireless radio repeater 242, a second wireless radio repeater 244, and a first wireless line sensor 246 disposed along the first distribution lines 236. The second area 234 may include second distribution lines 248, a second generator 16B, a second transformer 17B, a second IED 250, a second breaker 252, a third wireless radio repeater 254, a fourth wireless radio repeater 256, and a second wireless line sensor 258 disposed along the second distribution lines 248. Each of the wireless radio repeaters 242, 244, 254, 256 may verify a condition associated with its corresponding area 232, 234 to re-transmit a received message.

In an example circumstance, the first wireless line sensor 246 may identify a condition (e.g., a fault condition, an operating condition) associated with the first area 232 and transmit a message indicative of the condition. The second wireless radio repeater 244 may receive the message transmitted by the first wireless line sensor 246, verify the condition indicated by the message, and further re-transmit the message. The first wireless radio repeater 242 may receive the message re-transmitted by the second wireless radio repeater 244, verify the condition indicated by the message, and re-transmit the message to the first IED 238. Indeed, each of the first radio repeater 242 and the second radio repeater 244 may receive electrical measurement data associated with the first area 232, verify the condition based on the electrical measurement data, and re-transmit the message in response. The first IED 238 may then operate based on the message, such as by controlling the first breaker 240 to block electrical power from being transmitted through a portion of the first area 232.

In the illustrated embodiment, the message transmitted by the first wireless line sensor 246 may also be re-transmitted toward the third wireless radio repeater 254 and/or the fourth wireless radio repeater 256. For example, the third wireless radio repeater 254 and/or the fourth wireless radio repeater 256 may be located within a threshold distance of and/or have a line of sight communication path with the first wireless line sensor 246 and may therefore be able to receive messages transmitted by the first wireless line sensor 246. However, since the condition indicated by the message is relevant to the first area 232 and not to the second area 234, the third wireless radio repeater 254 and the fourth wireless radio repeater 256 may block re-transmission of the message. That is, the third wireless radio repeater 254 and the fourth wireless radio repeater 256 may receive electrical measurement data associated with the second area 234 and not the first area 232. Thus, neither the third wireless radio repeater 254 nor the fourth wireless radio repeater 256 may identify the condition indicated by the message and pertaining to the first area 232. As a result, the third wireless radio repeater 254 and the fourth wireless radio repeater 256 may not re-transmit the message received from the first wireless line sensor 246. As an example, the third wireless radio repeater 254 and/or the fourth wireless radio repeater 256 may receive the message from the first wireless line sensor 246, determine that the condition indicated by the message is not occurring at or relevant to the second area 234, and block re-transmission of the message in response. As another example, the third wireless radio repeater 254 and/or the fourth wireless radio repeater 256 may remain in respective closed configurations and therefore may not receive the message re-transmitted by the first wireless line sensor 246. In either example, the message may be transmitted to devices in the first area 232 and not the second area 234. Thus, the devices associated with the second area 234, such as the second IED 250, may not operate based on the message re-transmitted by the first wireless line sensor 246. Indeed, since the condition is not occurring at or relevant to the second area 234, a subsequent control action, which would have been performed based on the re-transmitted message, may not improve operation of the electric power delivery system 230. As such, blocking re-transmission of the message may block the control action from being performed an undesirably impacting the operation of the electric power delivery system 230.

Figure 10:
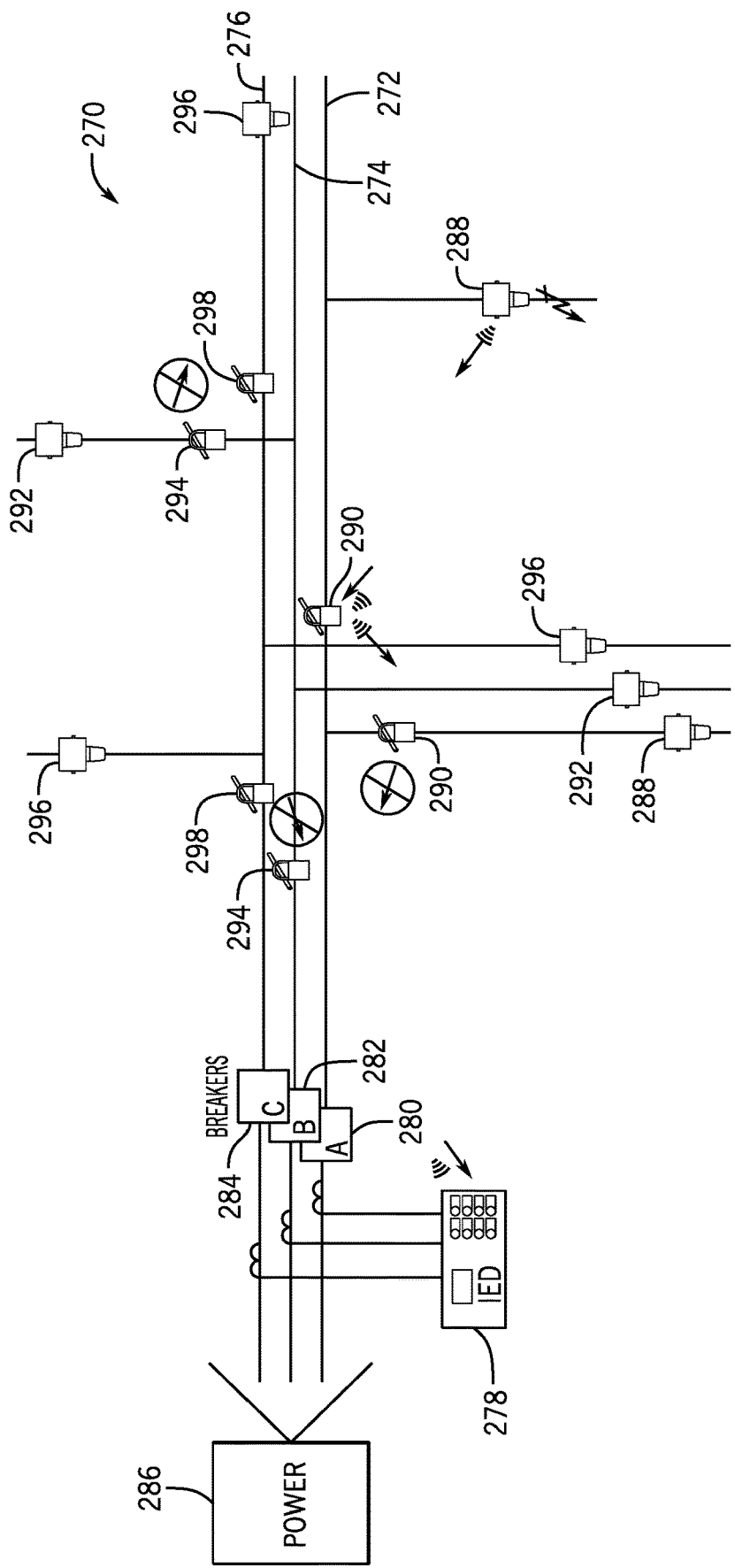
FIG. 10 is a schematic diagram of an electric power delivery system with wireless radio repeaters monitoring different distribution lines, in accordance with an embodiment.

FIG. 10 is a schematic diagram of an electric power delivery system 270 (e.g., a portion of the electric power delivery system 10 of FIG. 1) with wireless radio repeaters monitoring different distribution lines 272, 274, 276. In some embodiments, each of the distribution lines 272, 274, 276 may be located within a common geographical area and/or may be associated with a common device. For example, an IED 278 may control electrical power directed through each of the distribution lines 272, 274, 276, such as by controlling operation of respective breakers 280, 282, 284 associated with the distribution lines 272, 274, 276. However, each distribution line 272, 274, 276 may include a different condition, property, electrical measurement. For instance, a power source 286 (e.g., a three-phase power source) may be electrically coupled to the distribution lines 272, 274, 276 and may control electrical power transmitted through each of the distribution lines 272, 274, 276.

First wireless line sensors 288 and first wireless radio repeaters 290 may monitor a first distribution line 272, second wireless line sensors 292 and second wireless radio repeaters 294 may monitor a second distribution line 274, and third wireless line sensors 296 and third wireless radio repeaters 298 may monitor a third distribution line 276. For example, the first wireless line sensors 288 may obtain electrical measurements of the first distribution line 272, the second wireless line sensors 292 may obtain electrical measurements of the second distribution line 274, and the third wireless line sensors 296 may obtain electrical measurements of the third distribution line 276. The first wireless radio repeaters 290 may re-transmit a message indicative of a condition of the first distribution line 272, the second wireless radio repeaters 294 may re-transmit a message indicative of a condition of the second distribution line 274, and the third wireless radio repeaters 298 may re-transmit a message indicative of a condition of the third distribution line 276.

During an occurrence of a condition at one of the distribution lines 272, 274, 276, the devices associated with the distribution line may operate to transmit and re-transmit messages indicative of the condition, and other devices associated with other distribution lines may not transmit or re-transmit messages. By way of example, the first wireless line sensors 288 may obtain electrical measurements associated with the first distribution line 272, determine a condition associated with the first distribution line 272 based on the electrical measurements, and transmit a message indicative of the condition. The first wireless radio repeaters 290 may also obtain the electrical measurements associated with the first distribution line 272, receive the message transmitted by the first wireless line sensors 288, verify the condition indicated by the message (e.g., by performing the method 170 of FIG. 6) based on the electrical measurements, and re-transmit the message in response. As a result, the IED 278 may receive the message from the first wireless radio repeaters 290 and operate based on the message, such as by controlling the breaker 280 to block flow of electrical power through the first distribution line 272.

However, the condition associated with the first distribution line 272 may not pertain to the second distribution line 274 and/or the third distribution line 276. As such, the second wireless radio repeaters 294 and the third wireless radio repeaters 298 monitoring the second distribution line 274 and the third distribution line 276, respectively, (e.g., obtaining electrical measurements associated with the second distribution line 274 and the third distribution line 276, respectively, and not electrical measurements associated with the first distribution line 272) may not identify the condition associated with the first distribution line 272. In other words, the second wireless radio repeaters 294 and the third wireless radio repeaters 298 may determine that the condition indicated by the message is not reflected by the electrical measurements associated with the second distribution line 274 and/or the third distribution line 276. Therefore, the second wireless radio repeaters 294 and/or the third wireless radio repeaters 298 may not re-transmit the message transmitted or re-transmitted via the first wireless line sensors 288 and/or the first wireless radio repeaters 290. As a result, the IED 278 may receive messages transmitted or re-transmitted by devices associated with the first distribution line 272 and not devices associated with the second distribution line 274 and/or the third distribution line 276. Accordingly, the IED 278 may not receive additional (e.g., duplicate) messages that may impact operation of the IED 278.

By way of example, message transmission may be limited to devices specifically corresponding to the distribution line associated with a condition, thereby limiting interference of communication between devices corresponding to other distribution lines. For instance, the messages transmitted or re-transmitted via the devices associated with the first distribution line 272 may not be interfered with or otherwise affected by radio signals (e.g., other messages) transmitted by devices associated with the second distribution line 274 and/or the third distribution line 276. Additionally or alternatively, the receipt of multiple messages may affect performance of a control action. For example, the IED 278 may receive a first message and begin to perform a control action based on the first message to improve the operation of the electric power delivery system 270. However, during performance of the control action, the IED 278 may receive a second message and stop or limit performance the control action as a result of receiving the second message. Thus, an improvement of the operation of the electric power delivery system 270 may not be adequately achieved. In either case, limiting transmission and re-transmission of messages may improve operation of the electric power delivery system 270.

While specific embodiments and applications of the disclosure have been illustrated and described, it is to be understood that the disclosure is not limited to the precise configurations and components disclosed herein. For example, the systems, devices, and instructions described herein may be applied to other communication networks. The wireless radio repeaters may be coupled to distribution lines in locations that optimize successful transmission of data on these different networks. For example, wireless radio repeaters may repeat messages that are transmitted on a WiFi network. A benefit of the systems and methods of this disclosure may be an efficient, reliable connection in an environment that contains one or more obstacles to radio frequency transmissions. Accordingly, many changes may be made to the details of the above-described embodiments without departing from the underlying principles of this disclosure. The scope of the present disclosure should, therefore, be determined by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is intended to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . ", it is intended that such elements are to be interpreted under 35 U.S.C. 112 (f). For any claims containing elements designated in any other manner, however, it is intended that such element are not to be interpreted under 35 U.S.C. 112 (f).

What is claimed is:

1. A wireless radio repeater, comprising:
    an antenna configured to receive a message associated with an electric power delivery system, the message including a first condition of the electric power delivery system; and
    circuitry configured to perform operations comprising:
        receiving electrical measurement data;
        identifying a second condition of the electric power delivery system based on the electrical measurement data;
        comparing the first condition from the received message with the second condition;
        when the first condition corresponds with the second condition, causing the antenna to re-transmit the message received via the antenna in response to identifying the condition based on the electrical measurement data;
        blocking receipt of incoming messages via the antenna while the second condition of the electric power delivery system is not identified based on the electrical measurement data;
        enabling receipt of the incoming messages via the antenna in response to identifying the second condition based on the electrical measurement data, wherein the antenna is configured to receive the message after enabling the receipt of the incoming messages via the antenna; and
        causing the antenna to re-transmit the message in response to the antenna receiving the message.

2. The wireless radio repeater of claim 1, wherein the second condition comprises a low current, an overcurrent, an instantaneous voltage, a time after zero crossing of voltage or current, a sudden change in voltage or current, a low voltage, a sudden change in phase between voltage and current, a harmonic issue, or any combination thereof.

3. The wireless radio repeater of claim 1, wherein the antenna is configured to receive the message and re-transmit the message via radio signals.

4. The wireless radio repeater of claim 1, wherein the circuitry is configured to amplify the message received via the antenna and to cause the antenna to re-transmit the message after amplifying the message.

5. The wireless radio repeater of claim 1, wherein the antenna is configured to receive the message at a first frequency, and the circuitry is configured to cause the antenna to re-transmit the message at a second frequency.

6. A non-transitory computer-readable medium comprising instructions that, when executed by processing circuitry, are configured to cause the processing circuitry to perform operations comprising:
    receiving a message associated with an electric power delivery system, the message including a first condition of the electric power delivery system;
    receiving electrical measurement data associated with an electric power delivery system;

identifying a second condition of the electric power delivery system based on the electrical measurement data;

comparing the first condition from the received message with the second condition;

operating in a closed configuration to block receipt of incoming messages while the second condition of the electric power delivery system is not identified based on the electrical measurement data;

operating in an open configuration to enable receipt of the incoming messages in response to identifying the second condition based on the electrical measurement data;

receiving the message from the device of the electric power delivery system during operation in the open configuration;

re-transmitting the message upon receiving the message during operation in the open configuration; and, when the first condition corresponds with the second condition, performing an action based on the message received from a device of the electric power delivery system in response to identifying the first condition of the electric power delivery system.

7. The non-transitory computer-readable medium of claim 6, wherein the action comprises re-transmitting the message, blocking flow of electrical power through a portion of the electric power delivery system, or both.

8. The non-transitory computer-readable medium of claim 6, wherein the instructions, when executed by the processing circuitry, are configured to cause the processing circuitry to transition from operation in the open configuration to operation in the closed configuration after a threshold period of time has elapsed since operating in the open configuration.

9. The non-transitory computer-readable medium of claim 6, wherein the instructions, when executed by the processing circuitry, are configured to cause the processing circuitry to receive the message from a wireless radio repeater, an electrical measurement device, a sensor collector, a control system, an intelligent electronic device, or any combination thereof of the electric power delivery system.

10. A system, comprising:
a device configured to transmit a message indicative of a first condition associated with an electric power delivery system;
a repeater configured to perform operations comprising:
receiving the message transmitted by the device;
receiving electrical measurement data;
determining a second condition associated with the electric power delivery system
verifying the message based on the coordination of the first condition and the second condition; and
re-transmitting the message in response to verifying the message; and
an additional repeater configured to perform operations comprising:
receiving the message transmitted by the device;
processing second electrical measurement data associated with a second distribution line in response to receiving the message;
determining that the first condition indicated by the message is not indicated by the second electrical measurement data; and
blocking re-transmission of the message in response to determining that the first condition indicated by the message is not indicated by the second electrical measurement data.

11. The system of claim 10, wherein the repeater is configured to perform operations comprising:
operating in an open configuration to enable receipt of incoming messages in response to identifying the second condition; and
verifying the message by receiving the message while operating in the open configuration.

12. The system of claim 10, wherein the device comprises an electrical measurement device configured to perform operations comprising:
obtaining third electrical measurement data associated with the first distribution line; and
transmitting the message indicative of the first condition based on the third electrical measurement data.

13. The system of claim 10, comprising an additional repeater configured to perform operations comprising:
receiving the message re-transmitted by the repeater;
receiving additional electrical measurement data;
verifying the message based on the additional electrical measurement data; and
re-transmitting the message in response to verifying the condition.

* * * * *